Feb. 22, 1966     C. W. B. URMSTON     3,236,925
METHOD OF MANUFACTURING AERATED CONCRETE STRUCTURES
Filed Jan. 29, 1965     4 Sheets-Sheet 2

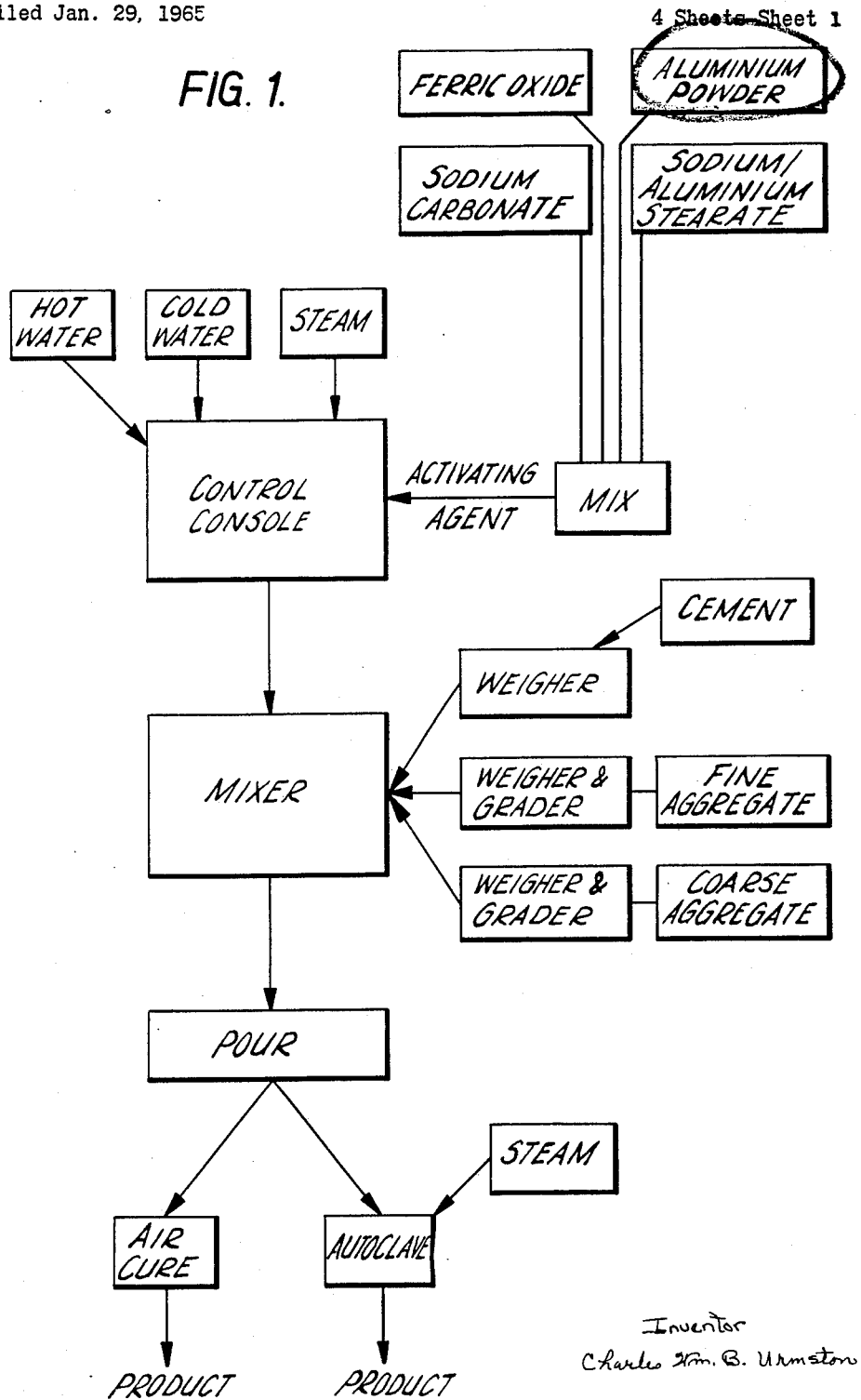

Feb. 22, 1966  C. W. B. URMSTON  3,236,925
METHOD OF MANUFACTURING AERATED CONCRETE STRUCTURES
Filed Jan. 29, 1965  4 Sheets-Sheet 3

Inventor
Charles Wm. B. Urmston

By Watson, Cole, Grindle & Watson
Attorneys

Feb. 22, 1966     C. W. B. URMSTON     3,236,925
METHOD OF MANUFACTURING AERATED CONCRETE STRUCTURES
Filed Jan. 29, 1965     4 Sheets-Sheet 4
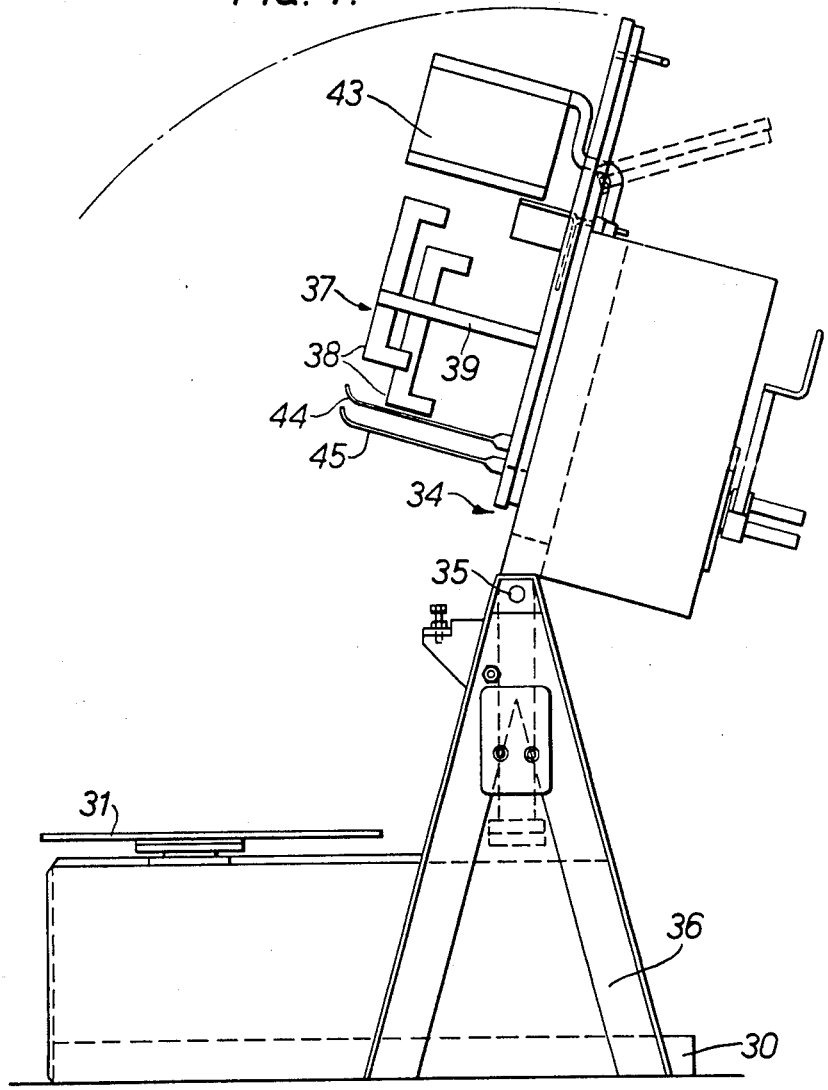

3,236,925
METHOD OF MANUFACTURING AERATED CONCRETE STRUCTURES
Charles William Brabazon Urmston, 9 Thurloe St., London, England
Filed Jan. 29, 1965, Ser. No. 429,051
Claims priority, application Great Britain, Apr. 13, 1962, 14,472/62; Jan. 31, 1964, 4,234/64, 4,235/64
28 Claims. (Cl. 264—42)

This application is a continuation-in-part of my copending application Serial No. 272,595, filed April 12, 1963.

This invention relates to the manufacture of aerated concrete, that is, concrete which sets with cells, not necessarily air-filled, which reduce its average density. Aerated concrete, which is commonly, but not necessarily, precast, is now considerably used in building, and lightness and strength are the normal, somewhat conflicting, requirements of this concrete. The invention is however not restricted to concrete in the sense of a cement-filler/aggregate combination and provides a process applicable to various cementitious materials with or without fillers or aggregates.

*General.*—A known process of producing aerated concrete is to introduce into the mix small proportion of finely divided aluminium and caustic soda. The object of the invention is to provide a process using finely divided aluminium which is able to give better results than this known process.

The invention provides a process wherein with a mix including cementitious material and finely divided aluminium and an alkali there is also incorporated ferric oxide or other catalyst in divided form and a soap preferably a soluble soap such as sodium or potassium stearate, the proportion of the latter being less than 2% by weight of the total dry material of the mix. The proportion of ferric oxide, is not critical, but it should be as finely ground as possible. Some amount less than 2% of ferric oxide is recommended, this proportion being by weight of the total dry material of the mix. It is preferred to use sodium carbonate as the alkali. Less than 5% (anhydrous) sodium carbonate is recommended, the proportion being again by weight of the total dry material.

Other things being equal, the material resulting from this process (in its preferred form) gradually improves as the concentration of sodium or potassium stearate increases from zero; a noticeable improvement occurs even at very low concentrations. Material made by the process of the invention can have greater strength than would be expected of a material of similar density made by the known process. For example, compressive strength after curing of over 2000 lb./sq. in. can be obtained with materials having a density as low as 60 lb./cu. ft. Such as aerated concrete can advantageously be used in a reinforced floor slab or beam.

However, if the concentration of potassium or sodium stearate is too high the resulting material quickly loses strength.

Material made by the process of the invention will normally exhibit low drying shrinkage and moisture movement, which renders it capable of many applications for which aerated concrete has hitherto been regarded as unsuitable.

In all cases the degree of control and amount of expansion achieved with a given amount of aluminium powder is greatly improved. Thus the amount of aluminium required for a given density will be reduced, in some cases by 30% or more, in comparison with the known process. In addition, the aluminum can be used in the form known as atomised powder, which is cheaper than the flake powders hereto regarded as indispensible in aerated concrete processes using aluminium.

A further major advantage of the process of this invention is the stability and strength of the foam which renders it tolerant of a great variety of different fillers and aggregates and thus gives great latitude in manufacturing technique. In this the process according to the invention contrasts with earlier process where good results could only be achieved with a very limited range of materials. In particular the invention permits the advantageous use of light-weight coarse aggregates, which is not practicable with the aerated concrete processes hitherto known. Thus, in other processes for producing aerated concrete the mix has to be too watery and the aggregate either floats in a mass at the top or sinks to the bottom, depending on its specific gravity, so that a homogeneous product cannot be obtained. The foamed mix produced according to the present invention is exceptionally stiff, stable and homogeneous and holds the coarse aggregate in position until it sets, so that the resulting product is homogeneous.

MAIN INGREDIENTS—GENERAL

*Cementitious material.*—Various types of such material may be used. In general, ordinary Portland rapid hardening cement as normally available commercially may successively be employed and many of the following examples use this material. However, it has now been found that if in the process described the cementitious material, prior to mixing, is ground down to a greater fineness than that of ordinary Portland rapid hardening cement as normally obtainable commercially, then the strength of the product is increased, or less of the cementitious material may be used. Accordingly it may sometimes be preferred to use what will herein be called "micron-sized cement" having the approximate characteristics set forth below.

(a) Size: Fineness 7550 square centimeters per gram.
(b) Performance: Soundness as per "le chateleir test" 1 millimeter expansion.
(c) Setting time:

Initial _____ minutes__ 120
Final _____ do____ 140

As compared with Portland rapid hardening with:
Initial _____ minutes__ 120
Final _____ do____ 360

(d) Typical particle grading analysis for micron-sized cement:

Retained on B.S., 240 _____ percent__ 0.1
Retained on B.S., 350 _____ do____ 0.2
Percentage finer than 25 microns _____ do____ 95
Percentage finer than 10 microns _____ do____ 60
Percentage finer than 5 microns _____ do____ 40
Percentage finer than 3 microns _____ do____ 25

The results obtained by the present invention are surprising in that "micron-sized cement" is believed to have been used hitherto only for accelerating the setting of ordinary dense concrete but without any improvement in the physical characteristics of the concrete and without any reduction in the proportion of cement in the mix, as compared with the proportions which are conventional practice with standard grade cement.

*Fine aggregate or filler.*—Fly ash (i.e. pulverized fuel ash) and/or sand will normally be used as a fine diluent or filler for the cementitious material. Comparatively large amounts of fine siliceous material (say, over 100% by weight of Portland cement) can be used with little detriment to the properties of the resulting material, and with great saving of cost.

*Coarse aggregate.*—Coarse aggregates of all types can be used at least up to ¾" size, and among those preferred are expanded plastics material such as expanded polystyrene, sintered fly ash pellets, sintered clay pellets, and foamed slag (crushed and sieved). Foamed slag, though an abundant and cheap waste material, has hitherto not been thought capable of use in an aerated concrete process where the resulting product had to be steam-cured, as is commonly desirable to improve its physical properties; however it can be used in the process according to the invention and the result successfully steam-cured.

With the process according to the invention it is possible to achieve with a suitable selection of materials, a product having any desired density within a large range (say 20 lbs./cu. ft. to 100 lbs./cu. ft.). The density of any coarse aggregate used is preferably about equal to that of the surrounding binding material.

"*Activating agent*".—It is preferred to introduce the aluminium, sodium carbonate, sodium (potassium) stearate and ferric oxide, which will be used only in small amounts, as a dry premixed powder. This powder may be made up as follows:

| | Parts by weight |
|---|---|
| Aluminium (atomised powder) | 10 |
| Sodium carbonate | 17.5 |
| Sodium stearate | 2 |
| Ferric oxide | 10 |

In the following the terms "activating agent" or "additives" will be understood to refer to a dry powder mixture made up as above.

MIXING TECHNIQUES

The process according to the invention can be carried out in a variety of ways and is not limited to particular mixing techniques. However such techniques form important subsidiary aspects of the invention and are believed contribute to its technical and commercial value.

In the drawings:

FIGURE 1 is a flow diagram illustrating a first mixing technique according to the invention;

FIGURES 3 and 4 are vertical sectional views of the FIGURE 2 mixing apparatus showing respectively the operating position of its parts and the position they adopt for pouring of the mix.

Referring to FIGURE 1, a dry powder mix constituting an "activating agent" is made as above described. Cement with any fillers or aggregates, previously sieved to the right sizes, are then mixed dry in the required proportions, in a suitable mixer. Water at a predetermined temperature, and in a given volume, is then fed into the mixer; the correct amount of activating agent is added to the water on its way to the mixer. The mixer may be of the pan type, and the mixer later described with reference to FIGURES 2 to 4 can be used. A conventional pan mixer will have to be run faster than its designed speed, if the best results are to be obtained.

Conveniently, hot and cold water and steam are fed separately into a control console, to produce the required volume of water at the right temperature automatically as determined by the setting of appropriate controls. The measured quantity of activating agent is also added at the console.

The mix, which by this time is complete, is mixed for a predetermined time, usually 1 to 4 minutes, and the result, which will have a thick creamy appearance, is poured out either into moulds, which may be made of any water and heat resisting material, or direct on to a floor or roof or other place where the concrete is to be laid. Once the poured material has set, it retains a cellular structure. The material may be left to cure naturally, or it may be steam cured (autoclaved) at a temperature of about 350° F. and a pressure of 160 lbs. per sq. in.

For constructional material of the highest quality, steam-curing is essential, and the ingredients of the mix must be proportioned accordingly.

The second mixing technique will now be described with reference to FIGURES 1a to 5. According to this aspect of the invention, the aluminium powder and fine aggregate are mixed by a method involving rapid movement of the various particles and sudden changes of the direction of movement; if coarse aggregate is to be employed it is added to the pre-mixed cementitious material and fine aggregate in a separate second mixing step which is terminated immediately the coarse aggregate is sufficiently distributed in the other material.

Figure 1A:
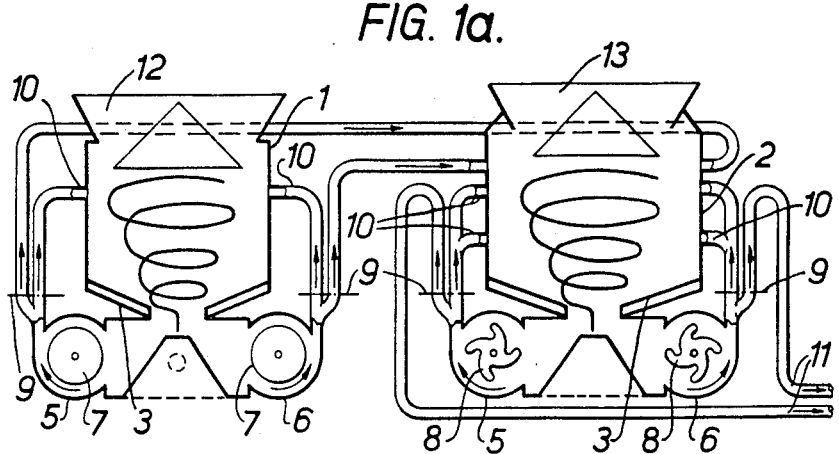
FIGURE 1a is a diagrammatic vertical section of a known mixing apparatus used in a second mixing technique according to the invention.

The mixing apparatus of FIGURE 1a is known commercially as the "DD16 double drum Colcrete mixer" manufactured by Colcrete Limited of Gun Lane, Strood, Kent, England. The apparatus includes first and second vertical drums 1, 2 each having a frusto-conical bottom wall 3 leading downward to a central aperture which provides communication between the interior of the drum and pump chambers 5, 6 situated opposite each other and beneath it. Within each of the pump chambers 5, 6 associated with the first drum 1 is an impeller 7 consisting of a series of discs whose peripheries lie close to the walls of the chamber: this impeller is rotated about a horizontal axis at 2000 r.p.m. The pump chambers 5, 6 associated with the second drum contain centrifugal impellers 8. The discharge ducts from each pump chamber 5, 6 are bifurcated and controlled by valves 9; in one setting of the valves, the flow from the pump chambers 5, 6 returns to the respective drum through tangentially disposed inlets 10. Alternatively the valves 9 for the drum 1 can be set for discharge of its content into the drum 2 and the valves 9 for the drum 2 can be set for discharge into delivery pipes 11.

Figure 5:
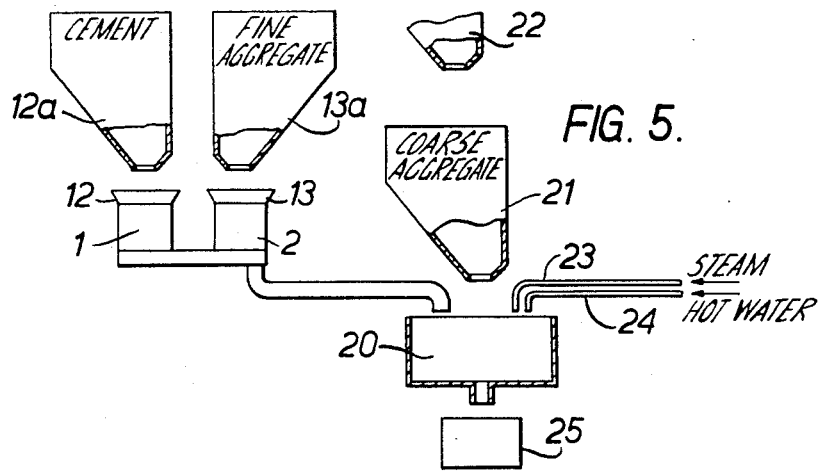
FIGURE 5 is a diagram showing preferred mixing steps of this second mixing technique.

A typical process according to the invention will involve Portland cement, fine aggregate and coarse aggregate, and also small amounts of "activating agent" being aluminum (preferably atomised powder), ferric oxide, sodium carbonate and sodium stearate. FIGURE 5, in conjunction with FIGURE 1a, illustrates a preferred method of carrying out the mixing of these ingredients, in accordance with the present invention. Firstly, the components of the activating agent are mixed dry in proper amounts: they are then introduced into a given amount of water at a given temperature, and the water is fed into the first drum 1 of the FIGURE 1 mixer, while the correct weights of cement and fine aggregate are fed respectively into hoppers 12, 13 above the drums 1 and 2 from weigh batchers 12a, 13a. The valves 9 for the drum 1 are set for recirculation through the inlets 10 so that, due to their tangential disposition, a vortex is set up in the drum. The cement is then caused to fall gradually into the vortex. In the vortex, the cement particles spin at some 400–500 ft./sec. for some 15 to 30 seconds, whereupon they enter one or other of the pump chambers 5, 6 and are forced by the impeller 7 at high speed along a curve of short radius through the narrow gap between the impeller and the chamber wall. It will be appreciated that particularly in passing between the drum, where the particles move in generally horizontal planes, and the pump chamber, where movement takes place in vertical planes, the cement particles undergo a sudden change in the direction of movement while travelling at high speed. The mixed cement and water is transferred to the second drum 2 by changing over the position of the valves 9 associated with the drum 1; the fine aggregate is then mixed into the cement and water in the same general manner as just described, and the cement, fine aggregate and water when fully mixed are discharged to a second mixer shown in FIGURE 4 and designated 20. This mixer 20, which can be of a standard type e.g. that known as the "Whirlflow" (made by Cornelly Equipment Co. Ltd.) is associated with a weigh batcher 21 receiving coarse aggregate from a heated storage hopper 22; steam and hot water supplies 23, 24 are provided to the mixer 20 so that a desired temperature can be quickly obtained in the mixer. The cement-fine aggregate mixture is mixed with the coarse aggregate in the mixer 20 for only so long as needed to obtain adequate distribution of the coarse aggregate, whereupon the mix is run into a skip 25 for pouring.

If the fine aggregate is fly ash, the process above described can be varied by using only one drum of the Colcrete mixer described, and by charging the cement and fly ash together into the same drum.

For the mixer 20 mentioned above, the mixer illustrated in FIGURES 2 to 4 can be used.

Figure 2:
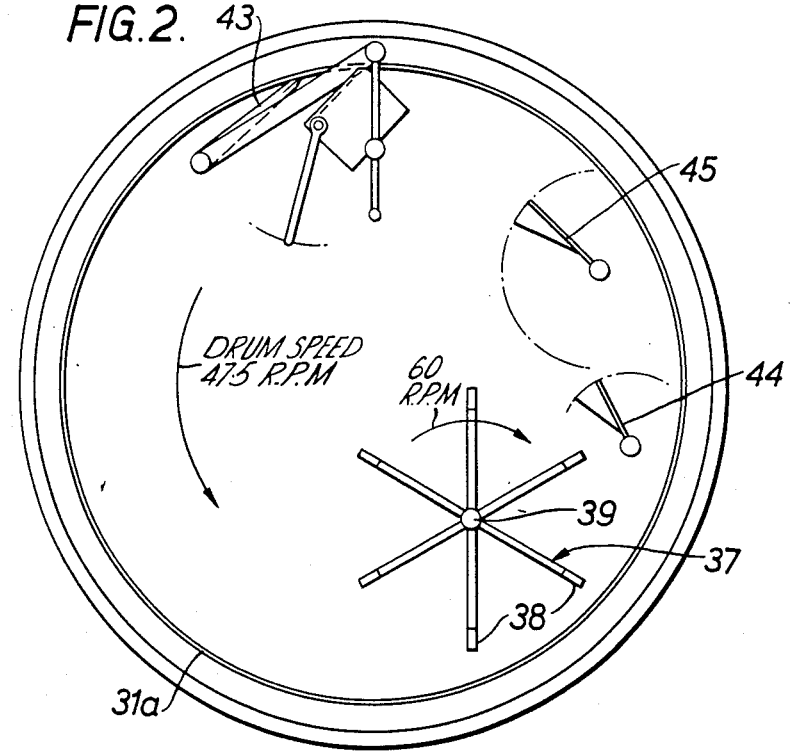
FIGURE 2 is a plan view of an alternative and novel mixing apparatus for use in this second mixing technique.
Figure 3:
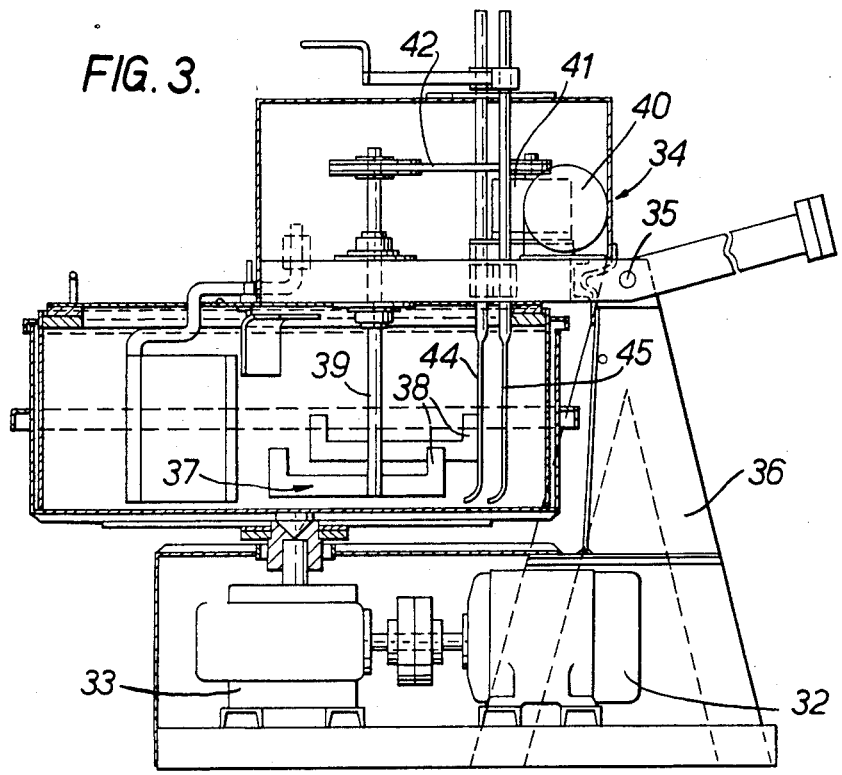

The mixer of FIGURES 2 to 4 comprises a base 30 on which is mounted a horizontal rotating turntable 31 driven by a motor 32 through a reduction gear box 33. The turntable 31 is adapted to carry a cylindrical pan 31a in which mixing takes place, and which is removable for pouring. The mixing gear, designated generally 34, is pivotally mounted at 35 upon a frame 36 upstanding from the base, so that it can be swung between a lowered, or operative, position shown in FIGURE 3 and a raised, or inoperative, position shown in FIGURE 4 which permits removal of the pan 31a. The mixing gear 34 comprises a paddle wheel 37 having two groups of paddles 38 mounted on a shaft 39 which in the operative position is vertical; the shaft 39 is driven by a motor 40 through a reduction gear 41 and belting 42; it will be seen that the paddle wheel 37 is eccentric of the pan axle and, as shown by the arrows, rotates in a direction opposite to that of the pan. An adjustable scraper blade 43 is mounted as part of the mixing gear 34 opposite the paddle wheel 37, and two adjustable vanes 44, 45 are also provided.

Both fine and coarse aggregate can be mixed together with the cement and water in the apparatus of FIGURES 2 to 4. In this case water previously mixed with the additives above mentioned in run into the pan 31a with the correct weights of cement and fine aggregate. The pan 31a and paddle wheel 37 are then rotated as shown: suitable speeds are 47.5 and 60 r.p.m. respectively. As the particles travel around the pan their direction of travel is suddenly practically reversed by the paddles 38. For mixing cement and fine aggregate in the FIGURES 2 to 4 mixer, higher speeds are required than normal in conventional pan mixers.

As before, if the mix requires coarse aggregate, this is added after thorough mixing of the cement and fine aggregate, and the mixing of the coarse aggregate is stopped as soon as possible.

As for the first mixing technique the material is preferably autoclaved, as above described.

EXAMPLES OF MIXES

The following Examples A to Q relates to the first mixing technique above described with reference to FIGURE 1.

*Example A*

| Ingredients: | Amounts |
|---|---|
| Cement _____lbs__ | 137 |
| Fly ash, sintered and ground _____lbs__ | 152 |
| Fine sand _____lbs__ | 125 |
| Activating agent (as above) _____grms__ | 825 |
| Water _____gallons__ | 15.85 |

(at 35° C.)

The mixing time was 3 minutes, and the set volume 12.85 cu. ft. The density of the product was 32 lbs./cu. ft., the compressive strength 500 to 600 lbs./sq. in. after autoclaving, the drying shrinkage 0.07 and the moisture movement 0.052%.

*Example B*

| Ingredients: | Amounts |
|---|---|
| Cement _____lbs__ | 180 |
| Fly ash, sintered and ground _____lbs__ | 201 |
| Fine sand _____lbs__ | 152 |
| Activating agent (as above) _____grms__ | 610 |
| Water _____gallons__ | 17.8 |

(at 38° C.)

The mixing time was 3 minutes, and the set volume 12.1 cu. ft. The density of the product was 45 lbs./cu. ft., the compressive strength 1000 to 1200 lbs./sq. in. after autoclaving, the drying shrinkage 0.06 and the moisture movement 0.05%.

*Example C*

| Ingredients: | Amounts |
|---|---|
| Cement _____lbs__ | 220 |
| Fly ash, sintered and ground _____lbs__ | 226 |
| Fine sand _____lbs__ | 175 |
| Activating agent (as above) _____grms__ | 156 |
| Water _____gallons__ | 18.7 |

(at 40° C.)

The mixing time was 2 minutes, and the set volume 8.75 cu. ft. The density of the product was 70 lbs./cu. ft., the compressive strength 2400 to 2800 lbs./sq. in. after autoclaving, the drying shrinkage 0.075 and the moisture movement 0.045%.

*Example D*

| Ingredients: | Amounts |
|---|---|
| Cement _____lbs__ | 204 |
| Fly ash _____lbs__ | 415 |
| Activating agent (as above) _____grms__ | 420 |
| Water _____gallons__ | 28.6 |

(at 40° C.)

The mixing time was 2½ minutes, and the set volume 12.3 cu. ft. The density of the product was 50 lbs./cu. ft. the compressive strength 1300 to 1500 lbs./sq. in. after autoclaving, the drying shrinkage 0.079 and the moisture movement 0.068%.

*Example E*

| Ingredients: | Amounts |
|---|---|
| Cement _____lbs__ | 210 |
| Fly ash _____lbs__ | 420 |
| Activating agent (as above) _____grms__ | 150 |
| Water _____gallons__ | 30.6 |

(55° C.)

The mixing time was 2 minutes, and the set volume 9 cu. ft. The density of the product was 70 lbs./cu. ft., the compressive strength 2500 to 2700 lbs./sq. in. after autoclaving, the drying shrinkage 0.075 and the moisture movement 0.055%.

*Example F*

| Ingredients: | Amounts |
|---|---|
| Cement _____lbs__ | 133 |
| Fly ash _____lbs__ | 268 |
| Activating agent (as above) _____grms | 1000 |
| Water _____gallons__ | 25 |

(at 60° C.)

The mixing time was 3½ minutes, and the set volume 13.4 cu. ft. The density of the product was 30 lbs./cu. ft., the compressive strength 500 to 600 lbs./sq. in. after autoclaving, the drying shrinkage 0.08 and the moisture movement 0.07%.

*Example G*

| Ingredients: | Amounts |
|---|---|
| Cement _____lbs__ | 187 |
| Fly ash _____lbs__ | 250 |
| Foamed slag _____lbs__ | 170 |
| Activating agent (as above) _____grms__ | 600 |
| Water _____gallons__ | 26.8 |

(at 65° C.)

The mixing time was 1½ minutes, and the set volume 11.4 cu. ft. The density of the product was 55 lbs./cu. ft., the compressive strength 1100 to 1300 lbs./sq. in. after autoclaving, the drying shrinkage 0.062 and the moisture movement 0.041%.

*Example H*

Ingredients: Amounts
- Cement _____ lbs__ 230
- Fly ash _____ lbs__ 292
- Foamed slag _____ lbs__ 202
- Activating agent (as above) _____ grms__ 210
- Water _____ gallons__ 29.8

(at 65° C.)

The mixing time was 1½ minutes, and the set volume 10 cu. ft. The densiity of the product was 75 lbs/cu. ft., the compressive strength 2000 to 2300 lbs./sq. in. after autoclaving, the drying shrinkage 0.063 and the moisture movement 0.042%.

*Example I*

Ingredients: Amounts
- Cement _____ lbs__ 127
- Fly ash _____ lbs__ 165
- Sintered fly ash aggregate pellets __ lbs__ 254
- Activating agent (as above) _____ grms__ 256
- Water _____ gallons__ 16

(at 65° C.)

The mixing time was 2 minutes, and the set volume 9.2 ft.³. The density of the product was 60 lbs./cu. ft., the compressive strength 1300 to 1400 lbs./sq. in. after autoclaving, the drying shrinkage 0.055 and the moisture movement 0.04%.

*Example J*

Ingredients: Amounts
- Cement _____ lbs__ 127
- Fly ash _____ lbs__ 165
- Sintered pellets _____ lbs__ 254
- Activating agent (as above) _____ grms__ 110
- Water _____ gallons__ 15.4

(at 62½° C.)

The mixing time was 2 minutes, and the set volume 7.3 cu. ft. The density of the product was 75 lbs./sq. ft., the compressive strength 2000 to 2200 lbs./sq. in. after autoclaving, the drying shrinkage 0.055 and the moisture movement 0.04%.

*Example K*

Ingredients: Amounts
- Cement _____ lbs__ 158
- Fly ash _____ lbs__ 206
- Sintered fly ash pellets _____ lbs__ 318
- Activating agent (as above) _____ grms__ 320
- Water _____ gallons__ 25.8

(at 60° C.)

The mixing time was 2 minutes, and the set volume 10.5 cu. ft. The density of the product was 65 lbs./cu. ft., the compressive strength 1500 to 1700 lbs./sq. in. after autoclaving, the drying shrinkage 0.056 and the moisture movement 0.04%.

*Example L*

Ingredients: Amounts
- Cement _____ lbs__ 130
- Sintered fuel ash _____ lbs__ 80
- Fine sand _____ lbs__ 92.5
- Fly ash _____ lbs__ 69
- Sintered fly ash pellets _____ lbs__ 172
- Activating agent (as above) _____ grms__ 145
- Water _____ gallons__ 18½

(at 62½° C.)

The mixing time was 2¾ minutes, and the set volume 8 cu. ft. The density of the product was 70 lbs./cu. ft., the compressive strength 1860 to 2250 lbs./sq. in. after autoclaving, the drying shrinkage 0.05 and the moisture movement 0.04%.

*Example M*

Ingredients: Amounts
- Cement _____ lbs__ 75
- Ash _____ lbs__ 125
- Clay pellets _____ lbs__ 30
- Activating agent (as above) _____ grms__ 100
- Water _____ gallons__ 12

(at 63° C.)

The mixing time was 2½ minutes, and the set volume 4 cu. ft. The density of the product was 62 lbs./cu. ft., the compressive strength 1850 lbs./sq. in. after autoclaving.

*Example N*

Ingredients: Amounts
- Cement _____ lbs__ 112
- Ash _____ lbs__ 145
- Clay pellets _____ lbs__ 120
- Activating agent (as above) _____ grms__ 75
- Water _____ gallons__ 12

(at 65° C.)

The mixing time was 3 minutes, and the set volume 6 cu. ft. The density of the product was 65 lbs./cu. ft., the compressive strength 2050 lbs./sq. in. after autoclaving.

*Example O*

Ingredients: Amounts
- Cement _____ lbs__ 86
- Ash _____ lbs__ 121
- Clay pellets _____ lbs__ 120
- Activating agent (as above) _____ grms__ 75
- Water _____ gallons__ 12.5

(at 60° C.)

The mixing time was 2 minutes, and the set volume 5 cu. ft. The density of the product was 65 lbs./cu. ft., the compressive strength 2500 lbs./sq. in. after autoclaving.

*Example P*

Ingredients: Amounts
- Cement _____ lbs__ 112
- Sintered fly ash _____ lbs__ 150
- Activating agent (as above) _____ grms__ 75
- Water _____ gallons__ 7.5

(at 65° C.)

The mixing time was 2 minutes, and the set volume 3.5 cu. ft. The density of the product was 70 lbs./cu. ft., the compressive strength 2800 lbs./sq. in. after autoclaving.

*Example Q*

Ingredients: Amounts
- Cement _____ lbs__ 112
- Sintered fly ash _____ lbs__ 150
- Activating agent (as above) _____ grms__ 70
- Water _____ gallons__ 6.7

(at 60° C.)

The mixing time was 2½ minutes, and the set volume 3.30 cu. ft. The density of the product was 80 lbs./cu. ft., the compressive strength 3750 lbs./sq. in. after autoclaving.

In all the foregoing examples the cement is Portland rapid hardening ordinary grade. Where fly ash is mentioned this is the ash of pulverized fuel, which is in the "raw" condition unless described as sintered or sintered and ground. Whether "raw" or sintered and ground it is to be understood that all the material passes a 100 sieve, and approximately 50% passes a 200 sieve, most being retained on a 300 sieve. For Examples A, B and C the sieve analysis of the sand is as follows.

| Size of sieve: | Percentage passing |
|---|---|
| 3/16" | 100 |
| 7 | 90 |
| 14 | 85 |
| 25 | 80 |
| 52 | 30 |
| 100 | 5 |
| 200 | --- |

For Examples G and H the sieve analysis of the foamed slag is as follows:

| Size of sieve: | Percentage passing |
|---|---|
| 3/16" | 100 |
| 7 | 98 |
| 14 | 78 |
| 25 | 50 |
| 52 | 26 |
| 100 | 12 |
| 200 | 5 |

For Examples I, J, K, M, N and O the sieve analysis of the pellets is as follows.

| Size of sieve: | Percentage passing |
|---|---|
| 1" | 100 |
| 3/4" | 99.3 |
| 1/2" | 89.3 |
| 3/8" | 47.8 |
| 1/4" | Nil |

For Example L the sieve analysis of the pellets is as follows.

| Size of sieve: | Percentage passing |
|---|---|
| 1" | 100 |
| 3/4" | 99.3 |
| 1/2" | 89.3 |
| 3/8" | 47.8 |
| 1/4" | Nil |

The sieve analysis of the sand is as follows.

| Size of sieve: | Percentage passing |
|---|---|
| 7 | 100 |
| 14 | 98 |
| 25 | 90 |
| 52 | 32 |
| 100 | 5 |
| 200 | 2 |

For Example P the sieve analysis of the sintered ash is as follows.

| Size of sieve: | Percentage passing |
|---|---|
| 7 | 100 |
| 14 | 98.3 |
| 25 | 37.5 |
| 52 | 0.3 |
| 100 | Nil |

For Example Q the sieve analysis of the sintered ash is as follows.

| Size of sieve: | Percentage passing |
|---|---|
| 3/8" | 100 |
| 3/16" | 99.3 |
| 7 | 92.6 |
| 14 | 3.2 |
| 25 | 1.1 |
| 52 | 0.3 |

FURTHER EXAMPLES OF MIXES

In all the above Examples A to Q, the quantity of cement may be halved if the cement is "micron-sized" as defined earlier in this specification.

The following Examples I to V relate to the second mixing technique, described in relation to FIGURES 1a to 5 and make use of "micron-sized" cement.

| Example No. | I | II | III | IV | V |
|---|---|---|---|---|---|
| 1. Cement, lb. (Portland cement "micron-sized," particulars as given above) | 56 | 56 | 56 | 56 | 56 |
| 2. Fine aggregate, lb. Pulverized "fly ash" (i.e. pulverized fuel ash), size 300 mesh | 224 | 224 | 224 | 224 | 224 |
| 3. Coarse aggregate, sintered clay pellets, weight, lb. | 200 | 252 | 115 | 147 | 252 |
| Size, inches | 3/4-1/8 | 3/4-1/8 | 3/4-1/4 | 3/4-1/4 | 3/4-1/4 |
| Volume, ft.³ | 5½ | 7 | 5½ | 7 | 7 |
| 4. Water, lb. | 155 | 157 | 160 | 175 | 175 |
| 5. Activating agent (made up as above stated) gms. | 60 | 100 | 60 | 450 | 450 |
| 6. Mixing temperature, °F.: | | | | | |
| Start | 63 | 63 | 63 | 63 | 63 |
| Finish | 65 | 65 | 65 | 65 | 65 |
| 7. Mixing time, minutes: | | | | | |
| Figure 1a mixer | 2 | 3 | 2 | 3 | 3 |
| Second mixer (20 in Figure 5) | 1 | 1 | 1 | 1 | 1 |
| 8. Approx. density of final material, lb./ft.³ | 80 | 80 | 70 | 50 | 50 |
| 9. Compressive strength, lbs./sq. in. | 4,200 | 4,000 | 2,560 | 1,550 | 1,200 |

Taking Example IV as an illustration, and taking the density of cement and fly ash as about 90 lbs./cu. ft. the mix will be seen to have the ratios cement/fine aggregate/coarse aggregate of approximately 1:4:12 by volume. This illustrates one important advantage of the process according to the invention, its remarkable economy, especially when the cement is "micron-sized."

All these Examples I to V may be modified for use of ordinary grade cement by doubling the cement quantities. Examples A to Q may be used with the second mixing technique and Examples I to V with the first mixing technique, with suitable adjustment of the mixing times.

ALTERNATIVE MATERIALS

Preferred embodiments of the invention have been discussed, but for various reasons it may sometimes be desirable to use other materials.

Thus, in place of the sodium stearate, other soaps can be used: examples of such soaps are barium, aluminium calcium, cadmium, ammonium lead, lithium, magnesium, and zinc, which are so slightly soluble as normally to be regarded as insoluble, and potassium, which is soluble. As previously mentioned soluble soaps are preferred.

Instead of ferric oxide as catalyst, other metal oxides in final divided form can be used, e.g. manganese, zinc and cobalt. Certain oxides. such as barium oxide, have been found to inhibit the reaction and their use is not advised.

By way of experiment a number of activating agents were made up as above described except that in place of the sodium stearate an equal weight of another stearate was taken: each activating agent contained one stearate from the list given in the paragraph before last, and was used in the following mix.

| Ingredient: | Amount |
|---|---|
| Cement | lbs 112 |
| Fly ash | lbs 145 |
| Activating agent | gm 350 |
| Water | gallons 13½ |

(at 65° C.)

After a mixing time of 2 minutes the mix was poured: for every activating agent, the dry density was in the range 49½ lb./cu. ft. to 53 lb./cu. ft. and the cube strength (after autoclaving) in the range 1500 lb./sq. in. to 1775 lb./sq. in. The cell structure, however, in each case somewhat inferior to what would have been obtained had the activating agent contained sodium stearate.

As a further experiment, activating agents were made up as described above and containing sodium stearate, except that in place of the ferric oxide similar amounts of manganese, cobalt and zinc were used, respectively. The activating agents were used in the mix just set forth, and gave dry densities of 48½–50½ lb./cu. ft. and strengths of 1225–1525 lb./sq. in.

It is to be noted that increasing the temperature will increase the rate of expansion of the mix and the degree to which it will expand. The density desired in the resulting material will determine the amount of aluminium to be used, and the amount of aggregate with a given amount of cement, together with the temperature at which mixing takes place, governs the amount of water to be used. The more water the higher the temperature that will be required for the same result, other things being equal. The denser the concrete the stronger it will be, with a given cement-filler/aggregate composition. Tables can be made to show the proportions of the various components of the mix which are required for given characteristics of the resulting material.

Portland cement is mentioned in the example, but other cements can be used, as well as lime, or combinations of these. As above mentioned, all types of fillers and aggregates may be used and their choice will be governed by the qualities required for a given product, and the price which can be asked for it. Some siliceous material is however, essential for any product which is to be autoclaved. The process of the invention can also be applied to plaster.

GENERAL APPLICATION OF MICRON-SIZED CEMENT AND MIXING TECHNIQUES

It is to be appreciated that the invention contemplates the use of micron-sized cement in aerated concrete processes using aluminium powder and alkali (and preferably also a catalyst) in cases where the soap is omitted, and that the mixing techniques above mentioned will also be of general application to such processes.

I claim:

1. A process of producing aerated concrete comprising the steps of forming a mix of cementitious material, aggregate and water; introducing into said mix finely divided aluminium, an oxide catalyst in finely divided form, an alkali and a soap the proportion of the latter being less than 2 percent by weight of the total dry material; agitating the mix to produce a uniform thick cream; and subsequently pouring the agitated mix into moulds.

2. A process as claimed in claim 1, wherein the soap comprises sodium stearate.

3. A process as claimed in claim 1, wherein the soap comprises potassium stearate.

4. A process as claimed in claim 1, wherein the catalyst is ferric oxide.

5. A process as claimed in claim 4, wherein the proportion of ferric oxide is less than 2% by weight of the total dry material of the mix.

6. A process as claimed in claim 1, wherein the alkali is sodium carbonate in an amount less than 5% by weight (anhydrous) of dry material.

7. A process as claimed in claim 1, wherein the cementitious material is predominantly Portland cement and is mixed with fly ash.

8. A process as claimed in claim 1, wherein the amount of fly ash is at least equal to that of the cement.

9. A process as claimed in claim 1, wherein the finely divided aluminium, oxide catalyst and soap are premixed and introduced into said mix in the water thereof.

10. A process as claimed in claim 1, wherein the cement is micron-sized.

11. A process as claimed in claim 1, wherein the aluminium is initially in the form of atomised powder.

12. A process of producing aerated concrete comprising the steps of forming a mix of cement, filler, coarse light-weight aggregate and water, introducing into said mix finely divided aluminium, an oxide catalyst in finely divided form, an alkali and a soap the proportion of the latter being less than 2 percent by weight of the total dry material; agitating the mix to produce a uniform thick cream; and subsequently pouring the agitated mix into moulds.

13. A process as claimed in claim 12, wherein the coarse aggregate includes sintered clay pellets.

14. A process as claimed in claim 12, wherein the coarse aggregate includes sintered fly ash.

15. A process as claimed in claim 12, wherein the coarse aggregate includes foamed slag.

16. A process as claimed in claim 12, wherein the density of the coarse aggregate is equal to that of the surrounding material in the finished product.

17. A process of producing aerated concrete including forming a dry mixture of finely divided aluminium, sodium carbonate, a finely divided metal oxide catalyst the metal being selected from the group consisting of iron, manganese, zinc and cobalt, and an alkali metal stearate; intimately mixing said dry mixture in a predetermined quantity of water; forming a mixture of cement, filler and coarse aggregate and said water and agitating the mixture to produce a uniform thick cream; subsequently pouring the agitated mix into moulds; and autoclaving with high pressure steam.

18. A process according to claim 17, wherein the coarse aggregate is light weight aggregate having a density of the same order as the density of the final material.

19. A process as claimed in claim 17, wherein the cement is micron-sized.

20. A process as claimed in claim 17 wherein said mix is formed by first mixing dry the cement filler and coarse aggregate and then adding said water.

21. A process as claimed in claim 17, wherein said mix is formed by first mixing the cement and filler with said water and subsequently adding the coarse aggregate.

22. A process of producing aerated concrete including making a first dry mixture of finely divided aluminium, an alkali, a finely divided catalyst and a soluble soap; making a second dry mixture of cement and filler; incorporating the first dry mixture in water; immediately thereafter adding the water to the second dry mixture and mixing; and pouring.

23. A process as claimed in claim 22, wherein coarse light-weight aggregate is incorporated in the second dry mixture before the addition of said water thereto, the average density of the aggregate being substantially equal to the average density of the surrounding material after setting.

24. A process of producing aerated concrete including making a first dry mixture of finely divided aluminium, sodium carbonate, a finely divided metal oxide catalyst the metal being selected from the group consisting of iron, manganese, zinc, cobalt and an alkali-metal stearate; making a second dry mixture of cement, fly ash and coarse light-weight aggregate; incorporating the first dry mixture in water; immediately thereafter adding the water to the second dry mixture and agitating; pouring into a mould; and autoclaving with high-pressure steam.

25. A process as claimed in claim 24, wherein the coarse aggregate is foamed slag.

26. A process of producing aerated concrete including making a first dry mixture of finely divided aluminium, sodium carbonate, a finely divided metal oxide catalyst the metal being selected from the group consisting of iron, manganese, zinc and cobalt, and an alkali metal stearate; incorporating the first dry mixture in water; thereafter forming a mix of cement, fine aggregate and said water; immediately thereafter mixing coarse aggregate with said mix of cement fine aggregate and water, agitating to achieve uniform distribution of the coarse aggregate and pouring into a mould; and autoclaving with high pressure steam.

27. A process as claimed in claim 26, wherein the coarse aggregate is of light-weight type.

28. A process as claimed in claim 26, wherein said mix of cement fine aggregate and water is produced by imposing thereon rapid movement thereof and sudden changes of direction of movement.

References Cited by the Examiner

UNITED STATES PATENTS

| | | | |
|---|---|---|---|
| 2,313,109 | 3/1943 | Wertz | 106—95 XR |
| 2,864,714 | 12/1958 | Dixon et al. | 264—42 XR |
| 3,141,857 | 7/1964 | Somner | 106—95 XR |

FOREIGN PATENTS

| | | |
|---|---|---|
| 368,742 | 3/1932 | Great Britain. |
| 596,550 | 1/1948 | Great Britain. |
| 648,280 | 1/1951 | Great Britain. |
| 153,684 | 5/1962 | Russia. |

ROBERT F. WHITE, *Primary Examiner.*